(12) United States Patent
Cupitt et al.

(10) Patent No.: US 9,240,164 B2
(45) Date of Patent: Jan. 19, 2016

(54) APPARATUS AND METHOD FOR PROVIDING A PAN AND ZOOM DISPLAY FOR A REPRESENTATION OF A PROCESS SYSTEM

(71) Applicant: Honeywell International Inc., Morristown, NJ (US)

(72) Inventors: David James Cupitt, Dee Why (AU); James Spear, Epping (AU); Graeme Laycock, Hunters Hill (AU); Ian Duncanson, Belrose (AU)

(73) Assignee: Honeywell International Inc., Morris Plains, NJ (US)

( * ) Notice: Subject to any disclaimer, the term of this patent is extended or adjusted under 35 U.S.C. 154(b) by 313 days.

(21) Appl. No.: 13/779,154

(22) Filed: Feb. 27, 2013

(65) Prior Publication Data

US 2014/0240356 A1 Aug. 28, 2014

(51) Int. Cl.
*G06T 3/40* (2006.01)
*G09G 5/14* (2006.01)
*G05B 23/02* (2006.01)
(Continued)

(52) U.S. Cl.
CPC .............. *G09G 5/14* (2013.01); *G05B 23/0272* (2013.01); *G05B 2219/31472* (2013.01); *G06F 3/0484* (2013.01); *G06F 9/4443* (2013.01);
(Continued)

(58) Field of Classification Search
CPC .. G05B 23/0272; G06T 11/206; G06T 11/60; G06T 3/40; G08B 23/00; G06F 3/0484; G06F 9/4443; G09G 5/14

USPC .......... 345/660, 440, 440.1, 440.2, 441, 442; 700/83, 84; 715/781, 838
See application file for complete search history.

(56) References Cited

U.S. PATENT DOCUMENTS 5,428,733 A 6/1995 Carr
5,576,946 A 11/1996 Bender et al.
(Continued)

FOREIGN PATENT DOCUMENTS

JP 2005317171 A 11/2005
JP 2008109552 A 5/2008
(Continued)

OTHER PUBLICATIONS

International Search Report dated Oct. 6, 2011 in connection with International Patent Application No. PCT/US2011/029290; 3 pages.
(Continued)

*Primary Examiner* — Jin-Cheng Wang (57) ABSTRACT

A method includes displaying regions in a graphical display. At least two regions correspond to different portions of a representation of an industrial process system. A thumbnail region corresponds to an entirety of the representation of the process system. A viewport region corresponds to a portion of the representation of the process system less than the entirety of the representation of the process system. The viewport region is disposed and movable within the thumbnail region. A current view region corresponds to a current view of the representation of the process system. The current view is associated with the viewport region. The method also includes, responsive to user activation, moving the viewport region within the thumbnail region and updating the current view region. The thumbnail region is configured to identify at least one fault condition indicator outside the viewport region.

20 Claims, 6 Drawing Sheets

(51) Int. Cl.
  *G06F 9/44* (2006.01)
  *G06F 3/0484* (2013.01)
  *G06T 11/60* (2006.01)
  *G08B 23/00* (2006.01)
  *G06T 11/20* (2006.01)

(52) U.S. Cl.
  CPC ............... *G06T 3/40* (2013.01); *G06T 11/206* (2013.01); *G06T 11/60* (2013.01); *G08B 23/00* (2013.01)

(56) References Cited

U.S. PATENT DOCUMENTS

| | | | |
|---|---|---|---|
| 5,631,825 | A | 5/1997 | van Weele et al. |
| 5,896,138 | A | 4/1999 | Riley |
| 5,943,236 | A | 8/1999 | Ohno et al. |
| 6,473,660 | B1 | 10/2002 | Thibault |
| 6,760,048 | B1 | 7/2004 | Bates et al. |
| 6,901,560 | B1 | 5/2005 | Guerlain et al. |
| 6,975,914 | B2 | 12/2005 | DeRemer et al. |
| 7,024,626 | B2 | 4/2006 | Ko |
| 7,242,991 | B2 | 7/2007 | Budinger et al. |
| 7,249,326 | B2 | 7/2007 | Stoakley et al. |
| 7,707,516 | B2 | 4/2010 | O'Mullan et al. |
| 8,169,643 | B2 | 5/2012 | Yamada |
| 8,589,814 | B2 | 11/2013 | Pandurangan et al. |
| 8,860,728 | B2 | 10/2014 | Cupitt et al. |
| 2003/0016206 | A1 | 1/2003 | Taitel |
| 2003/0217053 | A1 | 11/2003 | Bachman et al. |
| 2003/0217054 | A1 | 11/2003 | Bachman et al. |
| 2003/0220707 | A1 | 11/2003 | Budinger et al. |
| 2003/0225462 | A1 | 12/2003 | Bachman et al. |
| 2003/0225469 | A1 | 12/2003 | DeRemer et al. |
| 2004/0002950 | A1 | 1/2004 | Brennan et al. |
| 2004/0111194 | A1 | 6/2004 | Wie |
| 2007/0132779 | A1 | 6/2007 | Gilbert et al. |
| 2007/0161125 | A1 | 7/2007 | Rosenfeld et al. |
| 2008/0021726 | A1* | 1/2008 | Evans et al. .................. 705/1 |
| 2008/0077844 | A1 | 3/2008 | Kim et al. |
| 2008/0244449 | A1 | 10/2008 | Morrison et al. |
| 2008/0291201 | A1* | 11/2008 | Lafon .......................... 345/427 |
| 2008/0294275 | A1 | 11/2008 | Reichard et al. |
| 2009/0030556 | A1* | 1/2009 | Castelli et al. ................ 700/286 |
| 2009/0132954 | A1 | 5/2009 | Cupitt |
| 2009/0249205 | A1 | 10/2009 | Yoshimura et al. |
| 2009/0284530 | A1* | 11/2009 | Lester et al. .................. 345/440 |
| 2009/0300692 | A1 | 12/2009 | Mavlankar et al. |
| 2010/0017746 | A1* | 1/2010 | Husoy et al. .................. 715/781 |
| 2011/0115816 | A1 | 5/2011 | Brackney |
| 2011/0258568 | A1 | 10/2011 | Pandurangan et al. |
| 2012/0032985 | A1* | 2/2012 | Mikkelsen et al. ........... 345/660 |
| 2012/0062732 | A1 | 3/2012 | Marman et al. |
| 2013/0169644 | A1* | 7/2013 | Bolton .......................... 345/440 |
| 2013/0321461 | A1* | 12/2013 | Filip ............................. 345/632 |
| 2014/0364969 | A1* | 12/2014 | Timsjo et al. .................. 700/83 |
| 2014/0380177 | A1* | 12/2014 | Gutermuth et al. ........... 715/736 |

FOREIGN PATENT DOCUMENTS

| | | |
|---|---|---|
| WO | WO 03/089995 A2 | 10/2003 |
| WO | WO 2004/032392 A2 | 4/2004 |
| WO | WO 2008/063928 A2 | 5/2008 |
| WO | WO 2008/118891 A2 | 10/2008 |

OTHER PUBLICATIONS

Written Opinion of International Searching Authority dated Oct. 6, 2011 in connection with International Patent Application No. PCT/US2011/029290; 4 pages.

International Search Report dated Oct. 4, 2011 in connection with International Patent Application No. PCT/US2011/029919; 3 pages.

Written Opinion of International Searching Authority dated Oct. 4, 2011 in connection with International Patent Application No. PCT/US2011/029919; 4 pages.

International Search Report dated May 27, 2014 in connection with International Patent Application No. PCT/US2014/015502; 3 pages.

Written Opinion of International Searching Authority dated May 27, 2014 in connection with International Patent Application No. PCT/US2014/015502; 4 pages.

"Experion PKS with PMD Controller HMIWeb Technology User Interface"; Honeywell International Inc; Mar. 2008; 5 pages.

* cited by examiner

APPARATUS AND METHOD FOR PROVIDING A PAN AND ZOOM DISPLAY FOR A REPRESENTATION OF A PROCESS SYSTEM

TECHNICAL FIELD

This disclosure relates generally to process control systems and more specifically to an apparatus and method for providing a pan and zoom display for a representation of a process system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

An important function of process control systems is the ability to provide effective tools for operators to monitor and control industrial processes. These tools often include process schematics that graphically illustrate the industrial processes being controlled. In many cases, the process schematics for a large industrial process are divided into sections, so operators are able to view only smaller portions of the industrial process.

SUMMARY

This disclosure provides an apparatus and method for providing a pan and zoom display for a representation of a process system.

In a first embodiment, a method includes displaying a plurality of regions in a graphical display. At least two of the regions correspond to different portions of a representation of an industrial process system. The regions include a thumbnail region that corresponds to an entirety of the representation of the process system. The regions also include a viewport region that corresponds to a portion of the representation of the process system that is less than the entirety of the representation of the process system, where the viewport region is disposed and movable within the thumbnail region. The regions further include a current view region that corresponds to a current view of the representation of the process system, where the current view is associated with the viewport region. The method also includes, responsive to user activation, moving the viewport region within the thumbnail region and updating the current view region. The thumbnail region is configured to identify at least one fault condition indicator outside of the viewport region.

In a second embodiment, an apparatus includes at least one processing device configured to generate a graphical display having a plurality of regions. At least two of the regions correspond to different portions of a representation of an industrial process system. The regions include a thumbnail region that corresponds to an entirety of the representation of the process system. The regions also include a viewport region that corresponds to a portion of the representation of the process system that is less than the entirety of the representation of the process system, where the viewport region is disposed and movable within the thumbnail region. The regions further include a current view region that corresponds to a current view of the representation of the process system, where the current view is associated with the viewport region. The at least one processing device is further configured, responsive to user activation, to move the viewport region within the thumbnail region and to update the current view region. The thumbnail region is configured to identify at least one fault condition indicator outside of the viewport region.

In a third embodiment, a non-transitory computer readable storage medium includes instructions that, when executed by at least one processing device, cause the at least one processing device to perform the following steps. A graphical display having a plurality of regions is generated. At least two of the regions correspond to different portions of a representation of an industrial process system. The regions include a thumbnail region that corresponds to an entirety of the representation of the process system. The regions also include a viewport region that corresponds to a portion of the representation of the process system that is less than the entirety of the representation of the process system, where the viewport region is disposed and movable within the thumbnail region. The regions further include a current view region that corresponds to a current view of the representation of the process system, where the current view is associated with the viewport region. Responsive to user activation, the viewport region is moved within the thumbnail region, and the current view region is updated. The thumbnail region is configured to identify at least one fault condition indicator outside of the viewport region.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
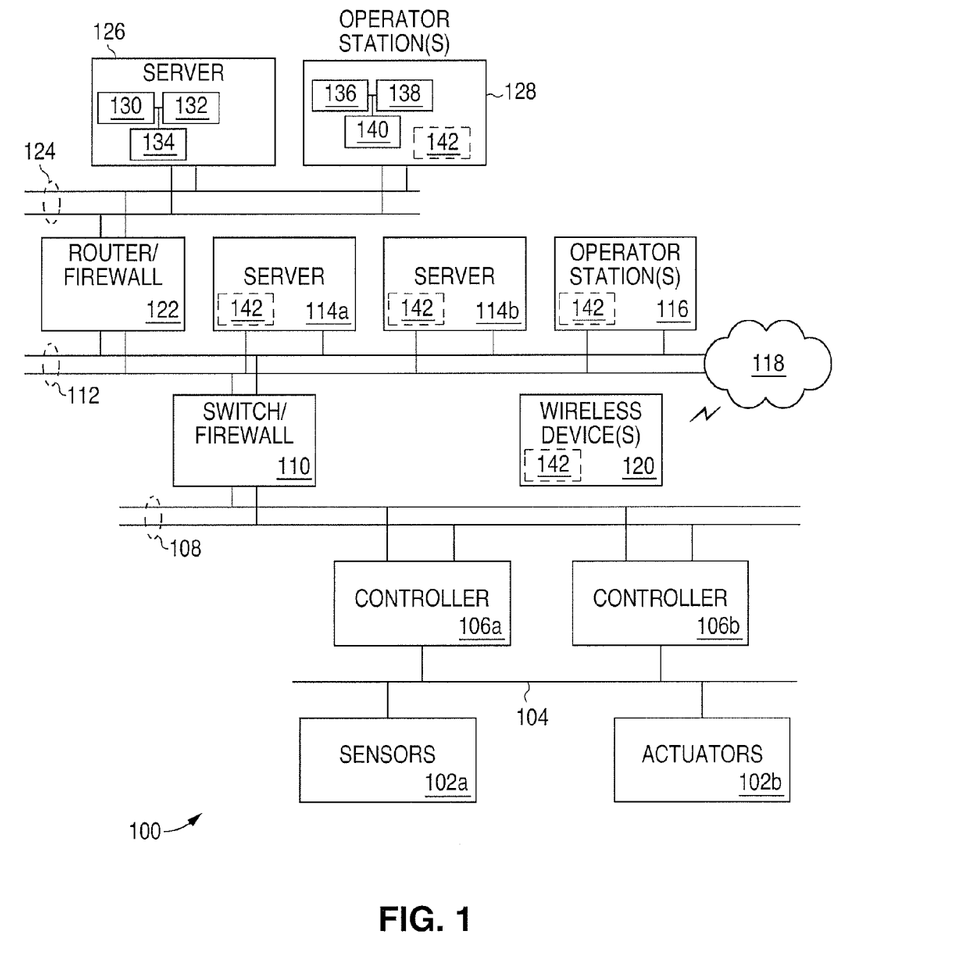
FIG. 1 illustrates an example process control system according to this disclosure.
Figure 2A:
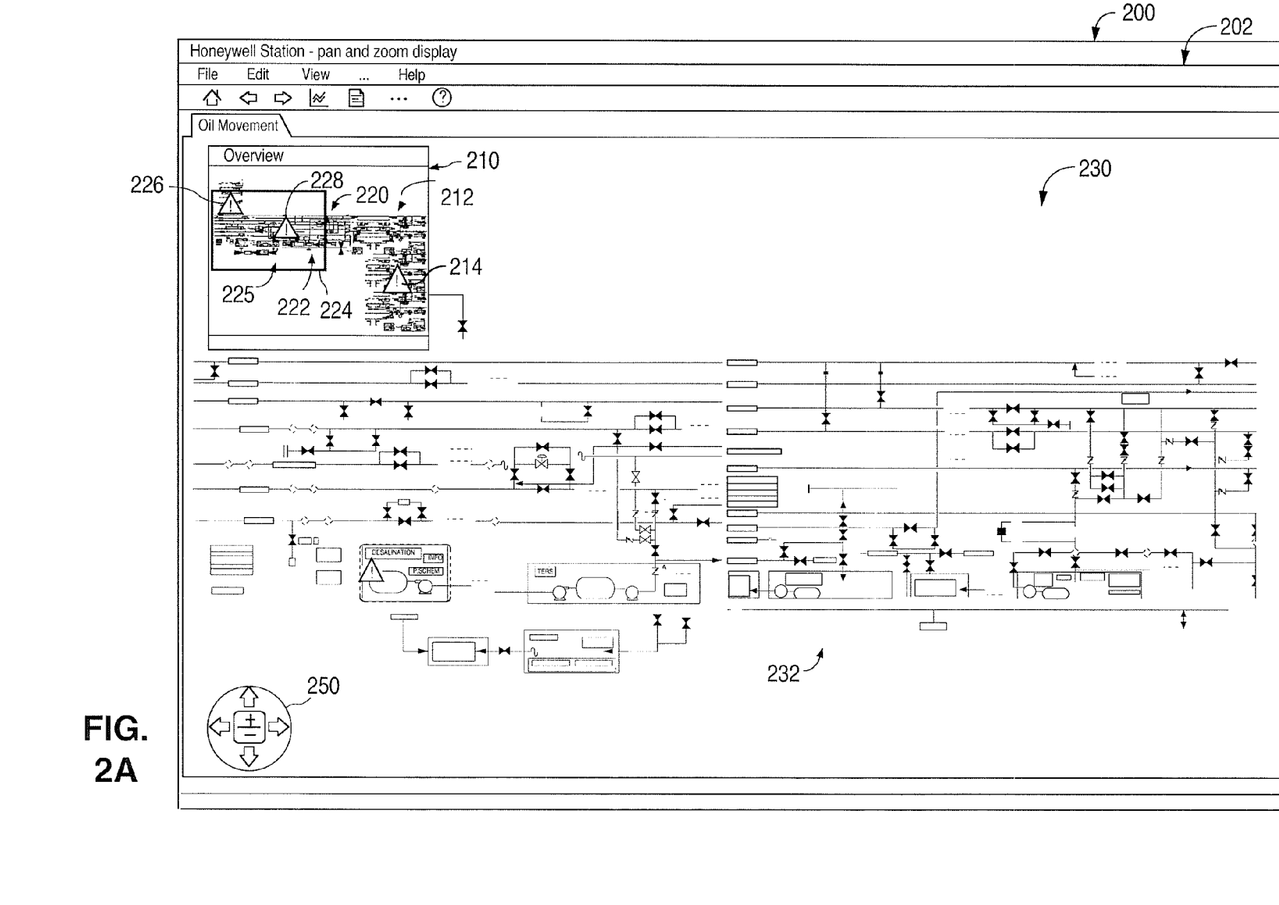
FIGS. 2A through 2D illustrate example pan and zoom displays for representations of a process system according to this disclosure.
Figure 2B:
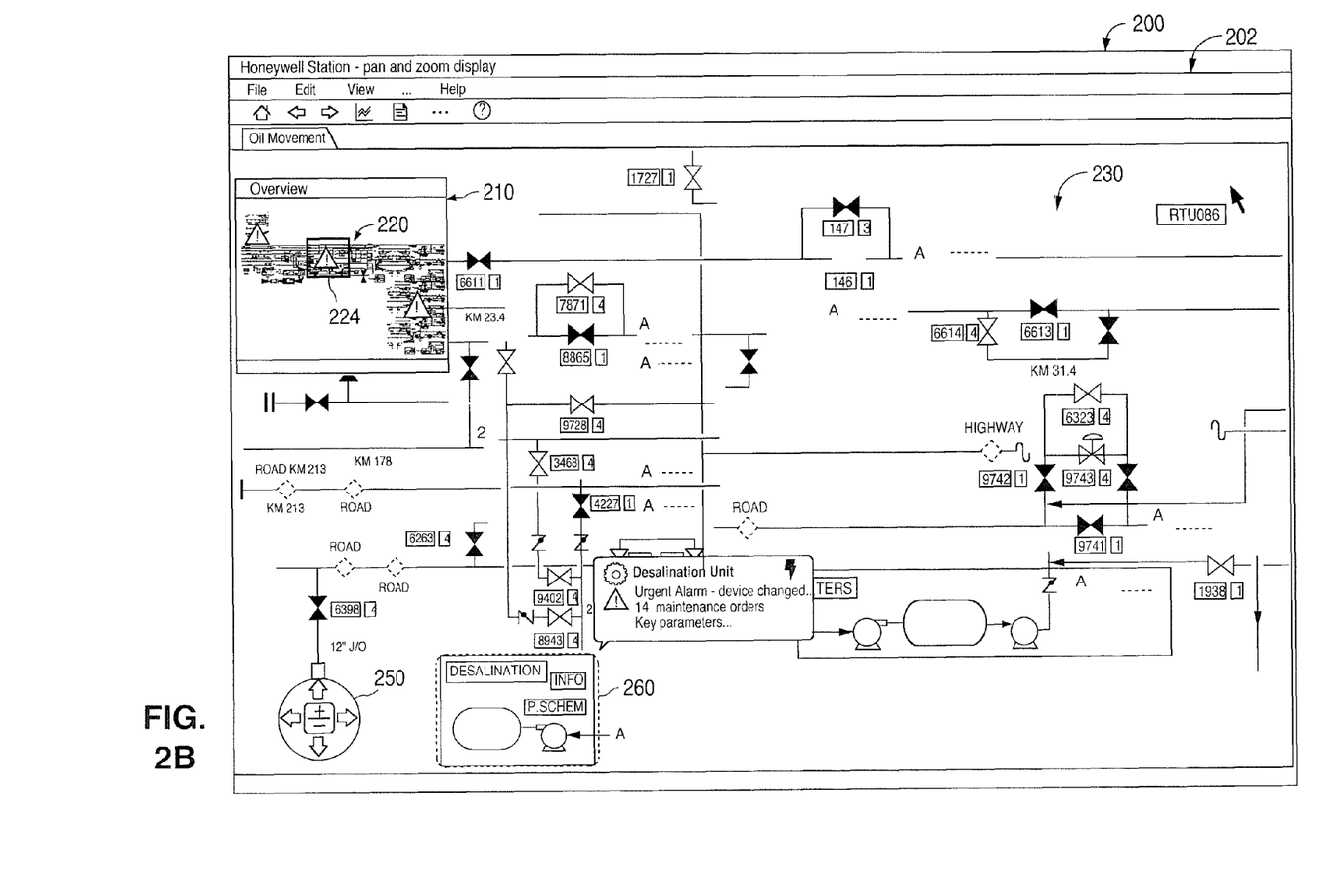
Figure 2C:
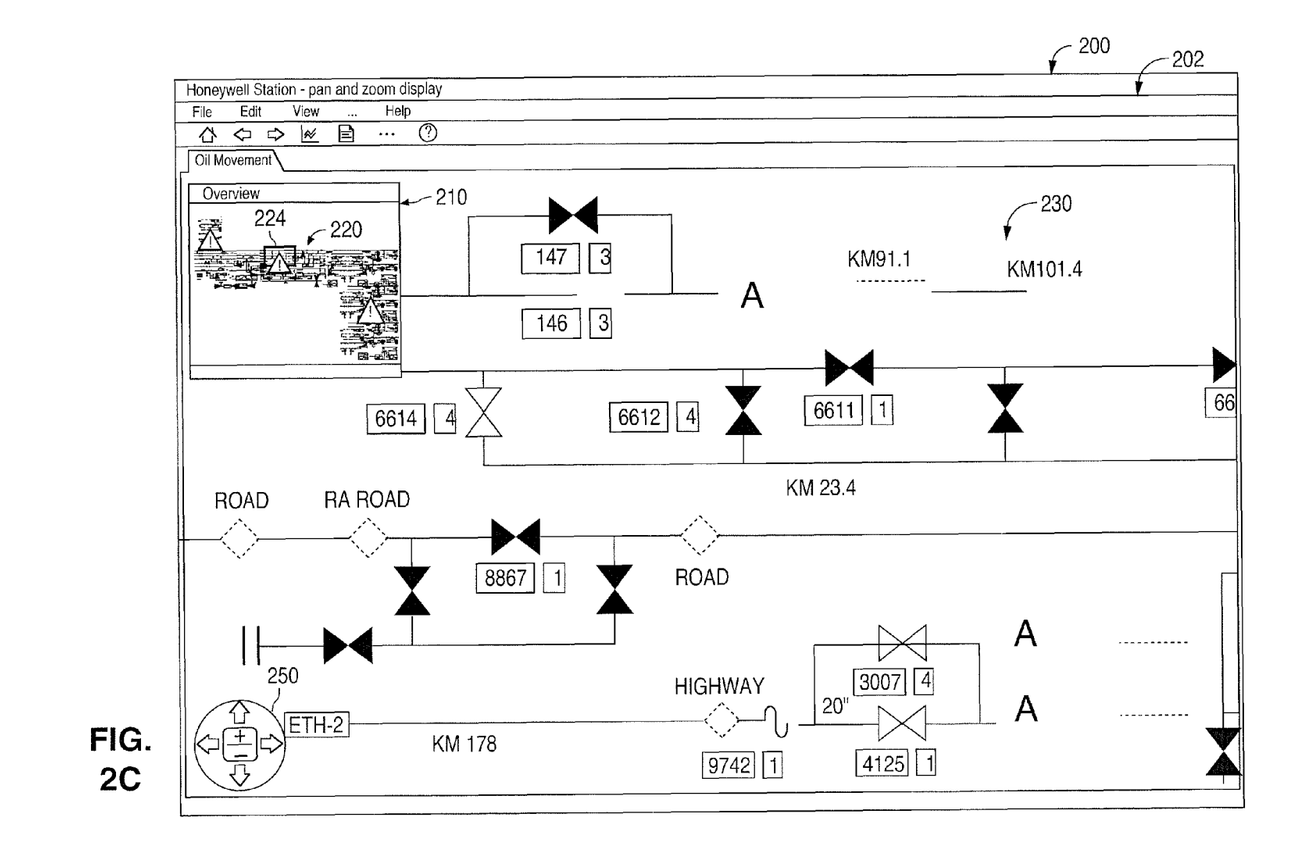
Figure 2D:
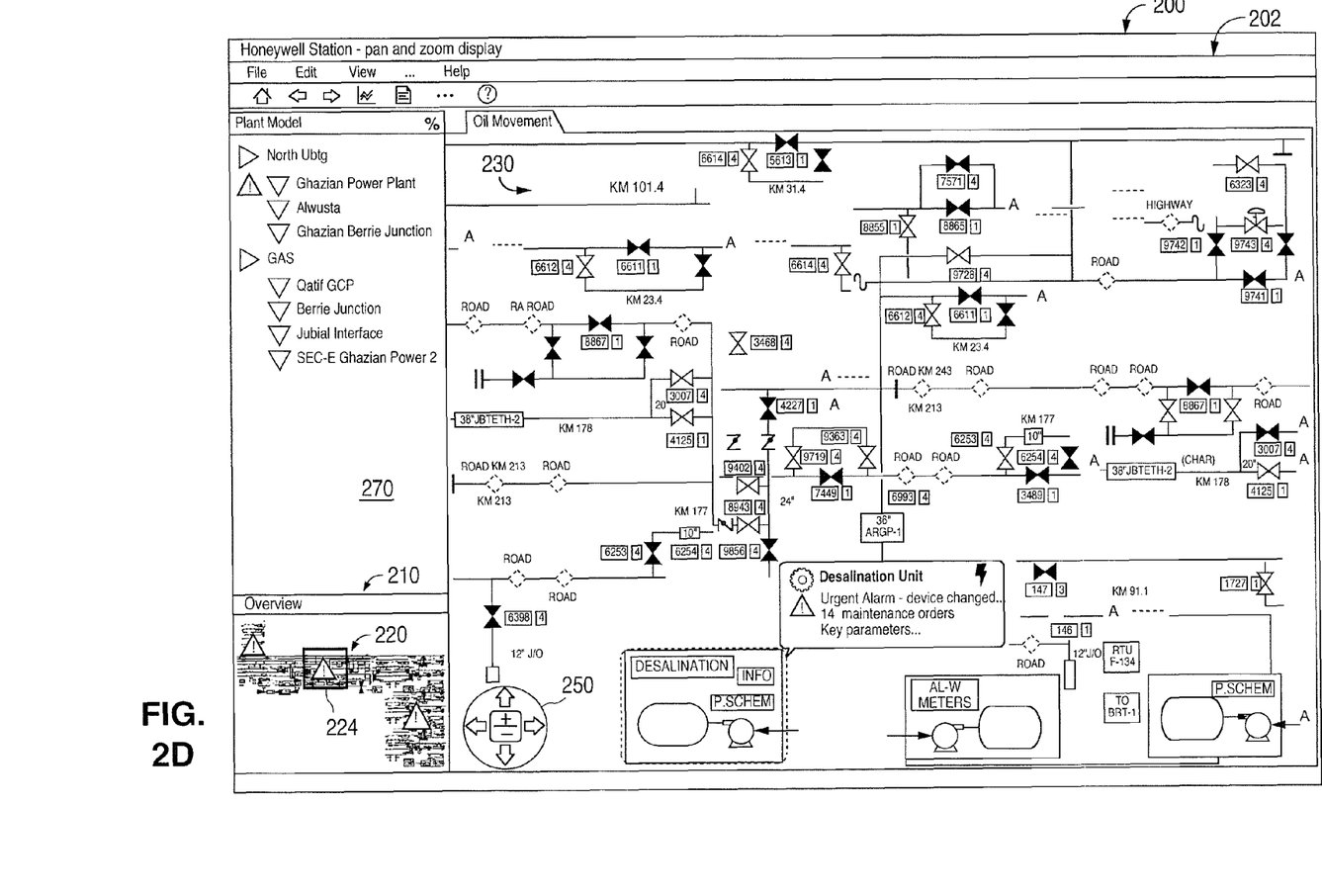
Figure 3:
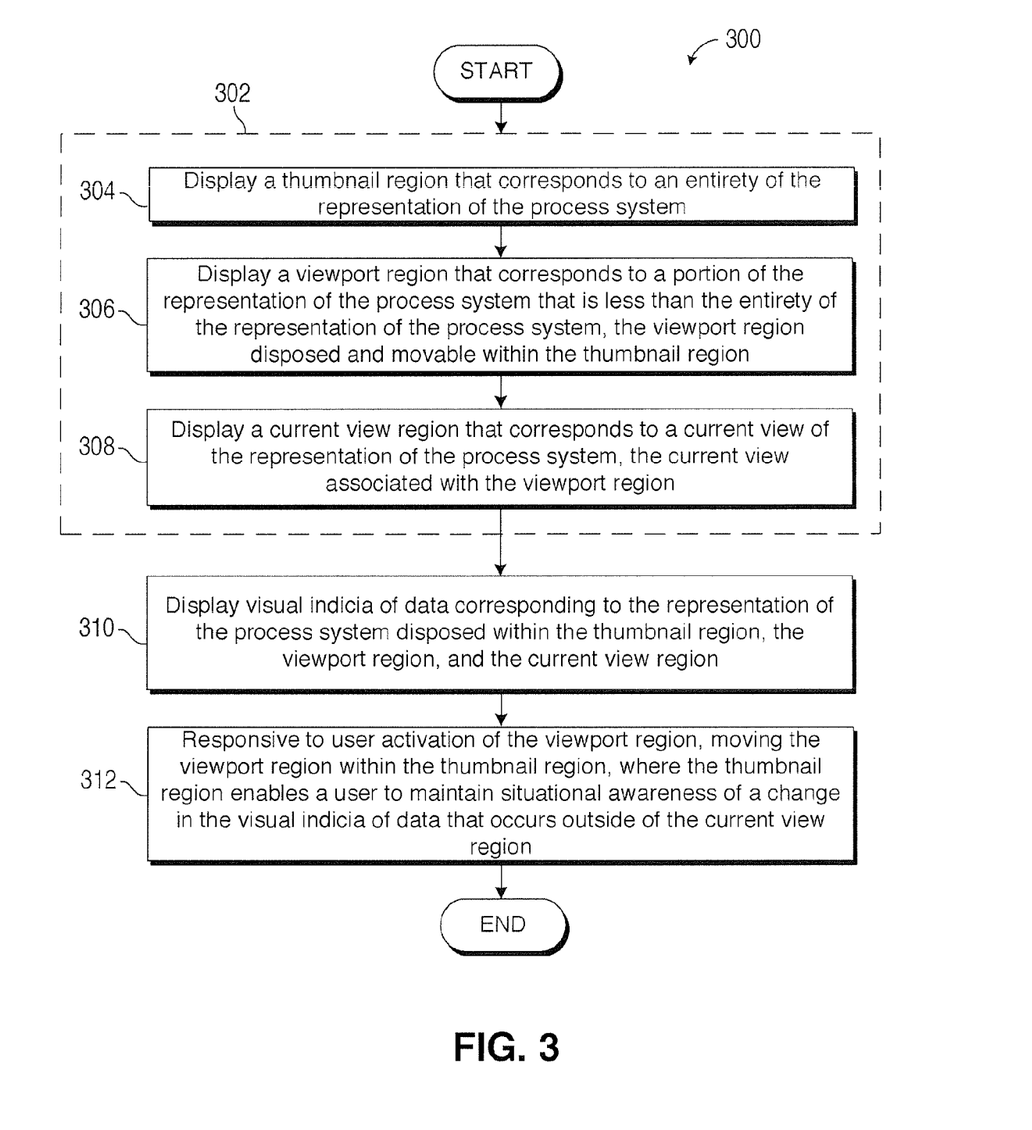
FIG. 3 illustrates an example method for providing a pan and zoom display for a representation of a process system according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example process control system 100 according to this disclosure. In this example embodiment, the process control system 100 includes various components that facilitate production or processing of at least one product or other material, such as one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. In addition, the actuators 102b could alter a wide variety of characteristics in the process system, such as heaters, motors, catalytic crackers, or valves. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

Two controllers 106a-106b are coupled to the network 104. The controllers 106a-106b may, among other things, use the measurements from the sensors 102a to control the operation of the actuators 102b. For example, the controllers 106a-106b could receive measurement data from the sensors 102a and use the measurement data to generate control signals for the actuators 102b. Each of the controllers 106a-106b includes any suitable structure for interacting with the sensors 102a and controlling the actuators 102b. The controllers 106a-106b could, for example, represent multivariable controllers or other types of controllers. As a particular example, each of the controllers 106a-106b could represent a computing device running a MICROSOFT WINDOWS operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any suitable structure for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any suitable structure for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any suitable structure for controlling the overall operation of the system 100.

One or more operator stations 128 are coupled to the networks 124. The operator stations 128 represent computing or communication devices providing, for example, user access to the servers 114a-114b, 126. Each of the operator stations 128 includes any suitable structure for supporting user access and control of the system 100. Each of the operator stations 128 could, for example, represent a computing device running a MICROSOFT WINDOWS operating system.

In particular embodiments, the various servers and operator stations may represent computing devices. For example, each of the servers 114a-114b, 126 could include one or more processors 130 and one or more memories 132 for storing instructions and data used, generated, or collected by the processor(s) 130. Each of the servers 114a-114b, 126 could also include at least one network interface 134, such as one or more Ethernet interfaces. Also, each of the operator stations 116, 128 could include one or more processors 136 and one or more memories 138 for storing instructions and data used, generated, or collected by the processor(s) 136. Each of the operator stations 116, 128 could also include at least one network interface 140, such as one or more Ethernet interfaces.

In one aspect of operation, to facilitate control over a process system, the operator stations 116, 128 may include one or more human-machine interface (HMI) applications 142. An HMI application 142 generally represents an application that generates graphical displays for presenting content to operators. The graphical displays visually represent one or more processes (or portions thereof) being monitored and/or controlled by the operators. An HMI application 142 can present any suitable graphical data to an operator, such as a process schematic that graphically illustrates a process to be controlled.

In some domains, a user may want to build one large process schematic display to represent a process system, such as an entire industrial process or plant, rather than dividing the representation into many separate displays. This could be due to the large-scale nature of the plant and/or when geography plays an important aspect in a process, such as a large field of wells or a pipeline where operators may prefer to pan along a large pipeline to monitor and control the process.

Building and supporting these schematic displays may pose challenges for a process control system. For example, the amount of data required to populate a display showing an entire process may overload downstream data providers that may have low bandwidth. Also, a lack of situational awareness may occur when an operator zooms in on a particular area of a large process, since the operator may not be aware of what alarms are occurring off the display.

To overcome these or other problems, the HMI application 142 can generate a graphical display containing a process schematic that graphically illustrates equipment used to perform a particular process. Any other suitable graphical display with other content associated with a process could be presented to an operator. The graphical display also includes pan and zoom controls, which allows an operator to zoom in on areas of the displayed process and to pan (move) the zoomed portion of the process. These controls provide for quick and easy navigation between locations within the process when monitoring and/or controlling the process. The display can further include a pan and zoom thumbnail that provides a thumbnail overview or an outline of the entire process. The thumbnail may include a viewport representation identifying the portion of the process currently being displayed, and the thumbnail can provide situational awareness of a fault condition that occurs outside of the current view. This can be accomplished using a fault condition indicator in the thumbnail, even when the fault occurs outside of the portion of the process currently being viewed. An example of a pan and zoom display including a thumbnail is shown in FIGS. 2A through 2D, which are described below.

Each HMI application 142 includes any suitable application for generating graphical displays representing at least part of a process being monitored and/or controlled. As a particular example, the HMI application 142 could use HMI-WEB technology from HONEYWELL INTERNATIONAL INC. The HMIWEB technology uses hypertext markup language (HTML) and allows users to build process control displays (web pages) that are loaded onto operator stations 116, 128. The HTML displays may use INTERNET EXPLORER or other browser technology to extend the functionality of the web pages to allow process information to be displayed and to allow operators to control processes via the web pages. In particular embodiments, the HMI application 142 can operate within a larger system, such as within EXPERION systems from HONEYWELL INTERNATIONAL INC.

Although FIG. 1 illustrates one example of a process control system 100, various changes may be made to FIG. 1. For example, a control system could include any number of sensors, actuators, controllers, servers, operator stations, networks, and HMI applications. Also, the makeup and arrangement of the process control system 100 in FIG. 1 is for illustration only. Components could be added, omitted, combined, or placed in any other suitable configuration according to particular needs. In addition, FIG. 1 illustrates one operational environment in which pan and zoom control in conjunction with a representation of a process system can be used. This functionality could be used in any other suitable device or system.

FIGS. 2A through 2D illustrates an example pan and zoom display 200 for representations of a process system according to this disclosure. The pan and zoom display 200 could be generated, for example, by the HMI application 142 in order to present information associated with a process system being controlled by the process control system 100.

The graphical display 200 illustrated in FIGS. 2A through 2D includes a window 202 rendered by the HMI application 142. The window 202 displays a plurality of regions 210, 220, 230, each corresponding to a different portion of a representation of a process system. For example, the window 202 may display a thumbnail region 210, a viewport region 220, and a current view region 230. It will be appreciated that the graphical display 200 may also be shown in a windowless mode of operation, such as a full screen display mode.

The thumbnail region 210 may be a popup display or other display that is generated automatically and that provides a framework for viewing a thumbnail overview of a pan and zoom display. The thumbnail region 210 may be repositioned within the window 202, may be placed within a navigation panel 270 (see FIG. 2D) within the window 202, and/or may be opened and closed.

The thumbnail region 210 includes operational data, such as visual indicia 212 of data, and corresponds to an entirety of the representation of the process system. For example, the thumbnail region 210 may provide an overview or an outline of an entire process system, such as a large process schematic representative of an entire process or plant. To illustrate, the large process schematic may be representative of a large geographically-dispersed system (such as a gas pipeline) or a complex multi-step process (such as a large oil refinery). The visual indicia 212 may include text, an image, or a combination thereof. For instance, the visual indicia 212 may include text and/or a schematic representation of operational data associated with sensors, actuators, other industrial equipment, or any combination thereof. The operational data may include data that is associated with the process system, such as sensor data or the like. In addition, the operational data may include fault condition data, and the visual indicia 212 may include a fault condition indicator, such as an alarm icon 214.

The viewport region 220 is disposed and moveable within the thumbnail region 210 and corresponds to a portion of the representation of the process system that is less than the entirety of the representation of the process system. For example, the viewport region 220 may include visual indicia 222 of data of a type similar to that of the visual indicia 212. The visual indicia 222 may be defined by a boundary 224 that encompasses some, but not all, of the visual indicia 212 in the thumbnail region 210. The visual indicia 222 within the viewport region 220 may also include fault condition indicators, such as alarm icons 226 and 228. Accordingly, any fault condition indicators that occur may be visible in the thumbnail region 210, which allows an operator to maintain situational awareness of those fault condition indicators (even when a fault occurs outside of the portion of the process currently being viewed).

The boundary 224 of the viewport region 220 may define a viewable area 225 in the viewport region 220. The viewable area 225 of the viewport region 220 includes the visual indicia 222 and is associated with the current view region 230 as described in further detail below. The current view region 230 may generally be described as an enlarged view of the viewable area 225, which shows part but not all of the process system. The boundary 224 of the viewport region 220 may be moved horizontally and/or vertically within the thumbnail region 210 responsive to user activation of the viewport region 220. As a result, the viewable area 225 within the viewport region 220 can change to display indicia that were previously not in view in the viewable area 225 or only partially in view in the viewable area 225.

To move the viewport region 220, a user may click on the graphical display 200 using a mouse or other pointer and may use a drag and drop method to move the boundary 224 of the viewport region 220. Alternatively, on-display controls 250 may be provided, and a user may click the controls 250 or tap on a touchscreen that includes the controls 250 to move the viewport region 220. In addition, the user may pass a pointer over the viewport region 220, click on another widget, perform a gesture, or use any other suitable input mechanism to move the viewport region 220.

Because the viewport region 220 is moveable within the thumbnail region 210, a user may quickly navigate between locations on the representation of the process system within the thumbnail region 210. Movement of the viewport region 220 changes the viewable area 225 and correspondingly changes the current view region 230. This may enable a user to view additional visual indicia, such as portions of the visual indicia 212 within the thumbnail region 210 that are outside of the boundary 224 of the viewport region 220 prior to the movement of the viewport region 220. For example, fault conditions identified by alarm icons that occur outside of the boundary 224 of the viewport region 220 (such as outside the viewable area 225 and correspondingly outside the current view region 230) are visible in the thumbnail region 210. This enables a user to maintain situational awareness of fault conditions, even those outside of the current view region 230.

The user may quickly move the viewport region 220 within the thumbnail region 210 to another location within the thumbnail region 210, such as to a location of one or more alarm icons that are outside the current boundary 224 of the viewport region 220. By moving the viewport region 220, the one or more alarm icons that were previously outside the boundary 224 may be placed within the boundary 224 of the viewport region 220 (and therefore within both the viewable area 225 and the current view region 230). To illustrate, if a fault condition causes the alarm icon 214 (which is outside the boundary 224 of the viewport region 220) to become active, a user may move the viewport region 220 within the thumbnail region 210 so that the alarm icon 214 is within the boundary 224 of the viewport region 220. When the viewport region 220 is moved, the viewable area 225 of the viewport region 220 will include the alarm icon 214, and the alarm icon 214 will be within the current view region 230. This enables the user to quickly navigate to the alarm icon 214 and to monitor the alarm icon 214 more closely.

The boundary 224 of the viewport region 220 may be resized (such as enlarged or shrunk) responsive to a second user activation, such as a zoom control. The viewable area 225 of the viewport region 220 may be resized in accordance with the resizing of the boundary 224. A zoom control may include any suitable amount of zoom. In some embodiments, the amount of zoom may be 50% to 200%. However, the amount of zoom may be different in other implementations. The zoom control may also include a proportional zoom (where objects are magnified or shrunk equally) or a semantic zoom (where a level of detail or an entire representation of a resized object is changed to fit into a current size). The zoom control may further include a "hyperzoom" feature, which could include a navigation hotspot on the graphical display 200 for linking pan and zoom displays. For example, a clickable hyperlink region 260 (shown in FIG. 2B) within the graphical display 200 may call up a predefined region or viewport within another pan and zoom display, which allows nesting of pan and zoom displays to effectively extend zoom range. A user may activate the hyperlink region 260 by positioning a pointer over the hyperlink region 260 and clicking a mouse, tapping a touchscreen, performing a gesture (such as a swipe gesture or a pinch gesture), engaging a mouse wheel, or providing any other suitable input.

A user may provide the second user activation by positioning a pointer over the viewport region 220 and clicking a mouse or tapping a touchscreen. The user may also click on another widget, perform a gesture (such as a swipe gesture or a pinch gesture), engage a mouse wheel, or click or tap the controls 250 to activate the zoom control. In response to the second user activation of the viewport region 220, the boundary 224 of the viewport region 220 may be resized by an amount that is inversely proportional to the amount of zoom. Visual indicia associated with the viewable area 225 of the viewport region 220 and displayed in the current view region 230 may be resized by an amount that is proportional to the amount of zoom as described in further detail below. To illustrate, if the second user activation of the viewport region 220 includes an amount of zoom approximately equal to 200%, the boundary 224 of the viewport region 220 may be decreased by a factor of two. The viewable area 225 of the viewport region 220 may similarly be decreased by a factor of two. For example, FIG. 2C illustrates the pan and zoom display having a user-selected amount of zoom equal to approximately 200%. Both a size of the boundary 224 and a size of the viewable area 225 of the viewport region 220 have been resized (decreased) compared to a size of the boundary 224 and a size of the viewable area 225 of the viewport region 220 at an amount of zoom equal to approximately 100% as shown in FIG. 2B.

Alternatively, if the second user activation of the viewport region 220 includes an amount of zoom equal to approximately 50%, the boundary 224 of the viewport region 220 may be increased by a factor of two. The viewable area 225 of the viewport region 220 may similarly be increased by a factor of two. For example, FIG. 2A illustrates the pan and zoom display having an amount of zoom equal to approximately 50%. Here, both a size of the boundary 224 and a size of the viewable area 225 of the viewport region 220 have been resized (increased) compared to a size of the boundary 224 and a size of the viewable area 225 of the viewport region 220 at an amount of zoom equal to approximately 100% as shown in FIG. 2B.

The current view region 230 is associated with the viewport region 220 and corresponds to a current view of the representation of the process system. For example, the current view region 230 may correspond to the viewable area 225 within the boundary 224 of the viewport region 220 and may include visual indicia 232 of data of a type similar to that of the visual indicia 222. The visual indicia 232 shown in the current view region 230 may be an enlarged set of the visual indicia 222 within the viewport region 220. The current view region 230 may be updated in response to movement of the viewport region 220. For example, movement of the viewport region 220 causes the viewable area 225 within the viewport region 220 to change. The current view region 230 may be updated in correspondence with the change in the viewable area 225 of the viewport region 220 so that the current view region 230 continues to display an enlarged view of the viewable area 225.

Operational data, other than fault condition data, may be subscribed or unsubscribed based on whether the operational data is visible in the current view region 230. For example, assume a user pans (moves) the viewport region 220 within the thumbnail region 210 into a different location of the process system representation. When this occurs, the operational data that is no longer in the current view region 230 may be unsubscribed (other than fault condition data), and the operational data that has come into view in the current view region 230 may be subscribed. This reduces an amount of data processing needed to populate and maintain the graphical display 200. For instance, when the viewport region 220 is moved within the thumbnail region 210, the viewable area 225 changes, and the current view region 230 may be updated in correspondence with the changes in the viewable area 225. The process system may only subscribe to operational data that is within the current view region 230. Operational data outside the current view region 230 may be unsubscribed, except for fault condition data.

The visual indicia 232 of data within the current view region 230 may be resized (such as enlarged or shrunk) responsive to the second user activation (the zoom control). For example, in response to the second user activation of the zoom control associated with the viewport region 220, the visual indicia 232 may be resized by an amount that is proportional to the amount of zoom. To illustrate, if the amount of zoom equals approximately 200%, the visual indicia 232 within the current view region 230 may be increased by an amount that is proportional. For example, FIG. 2C illustrates the pan and zoom display having a user-selected amount of zoom equal to approximately 200%. The visual indicia 232 within the current view region 230 have been resized (increased) as compared to a size of the visual indicia 232 within the current view region 230 at an amount of zoom equal to approximately 100% as shown in FIG. 2B.

Alternatively, if the second user activation of the viewport region 220 includes an amount of zoom equal to approximately 50%, the visual indicia 232 within the current view region 230 may again be resized by an amount that is proportional. For example, FIG. 2A illustrates a pan and zoom display having an amount of zoom equal to approximately 50%. Here, the visual indicia 232 within the current view region 230 have been resized (decreased) as compared to a size of the visual indicia 232 within the current view region 230 at an amount of zoom equal to approximately 100% as shown in FIG. 2B. The second user activation of the viewport region 220 allows a user to zoom in on or out of a particular location of the process system representation. Among other things, this enables a user to monitor a fault condition more closely.

As explained above with respect to moving (panning) the viewport region 220, the current view region 230 may be updated in correspondence with a change in the amount of zoom selected for the viewable area 225 of the viewport region 220. As such, when a user zooms into or out of locations of the process system representation, the operational data that is no longer in the current view region 230 may be unsubscribed (other than fault condition data), and the operational data that has come into view may be subscribed. For example, when the viewport region 220 is activated via the zoom control, the viewable area 225 changes, and the current view region 230 may be updated in correspondence with the changes in the viewable area 225. The process system may only subscribe to operational data that is within the current view region 230. Operational data outside the current view region 230 may be unsubscribed, except for fault condition data.

Although FIGS. 2A through 2D illustrate an example of a pan and zoom display 200 for representations of a process system, various changes may be made to FIGS. 2A through 2D. For example, the process system shown here is for illustration only, and any other suitable process system can be displayed. Also, the positions of certain features, such as the relative positions of the regions 210 and 230 and the controls 250, can be changed.

FIG. 3 illustrates an example method 300 for providing a pan and zoom display for a representation of a process system according to this disclosure. The method 300 could, for example, be used by the HMI application 142 in the process control system 100 of FIG. 1.

A plurality of regions may be displayed, where each region corresponds to a different portion of a representation of a process system, at step 302. For example, the HMI application 142 of FIG. 1 may generate the graphical display 200 of FIGS. 2A through 2D, which can be displayed at any of the operator stations 116, 128 of FIG. 1.

As part of this step, a thumbnail region that corresponds to an entirety of the representation of the process system is displayed at 304. For example, the thumbnail region 210 of FIGS. 2A through 2D may be displayed at any of the operator stations 116, 128 of FIG. 1. Also, a viewport region that corresponds to a portion of the representation of the process system that is less than the entirety of the representation of the process system is displayed at step 306. The viewport region is disposed and movable within the thumbnail region. For example, the viewport region 220 of FIGS. 2A through 2D may be displayed at any of the operator stations 116, 128 of FIG. 1. In addition, a current view region that corresponds to a current view of the representation of the process system is displayed at step 308. The current view is associated with the viewport region. For example, the current view region 230 of FIGS. 2A through 2D may be displayed at any of the operator stations 116, 128 of FIG. 1. The current view may correspond to an enlarged view of the viewable area 225 of the viewport region 220 of FIGS. 2A through 2D.

Visual indicia of data corresponding to the representation of the process system disposed within the thumbnail region, the viewport region, and the current view region are displayed at step 310. For example, a portion of the visual indicia 212 of FIG. 2A may be disposed within the thumbnail region 210 of FIGS. 2A through 2D and may be displayed at the operator stations 116, 128 of FIG. 1. Also, a portion of the visual indicia 222 of FIG. 2A may be disposed within the viewport region 220 of FIGS. 2A through 2D and may be displayed at the operator stations 116, 128 of FIG. 1. In addition, a portion of the visual indicia 232 of FIG. 2A may be disposed within the current view region 230 of FIGS. 2A through 2D and may be displayed at the operator stations 116, 128 of FIG. 1.

The viewport region may be moved within the thumbnail region responsive to user activation, where the thumbnail region enables a user to maintain situational awareness of a change in visual indicia of data that occurs outside of the current view region, at step 312. For example, the viewport region 220 of FIGS. 2A through 2D may be moved within the thumbnail region 210 responsive to a drag and drop method to move the boundary 224 of the viewport region 220. Alternatively, the viewport region 220 may be moved via the controls 250, or the user may pass a pointer over the viewport region 220, click on another widget, or perform a gesture (such as a swipe or a pinch) to move the viewport region 220 within the thumbnail region 210. Fault conditions identified by alarm icons that occur outside of the boundary 224 of the viewport region 220 (outside the viewable area 225 and correspondingly outside the current view region 230) will be visible in the thumbnail region 210. This enables a user to maintain situational awareness of those fault conditions outside of the current view region 230.

Although FIG. 3 illustrates one example of a method 300 for providing a pan and zoom display for a representation of a process system, various changes may be made to FIG. 3. For example, while shown as a series of steps, various steps shown in FIG. 3 could overlap, occur in parallel, occur in a different order, or occur multiple times. Moreover, some steps could be combined or removed and additional steps could be added according to particular needs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware or a combination of hardware and software/firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
displaying a plurality of regions in a graphical display, at least two of the regions corresponding to different portions of a representation of an industrial process system, wherein the regions include:
a thumbnail region that corresponds to an entirety of the representation of the process system, wherein the thumbnail region comprises a thumbnail viewport identifying a first viewable area defined by a boundary disposed and movable within the thumbnail region that corresponds to a portion of the representation of the process system that is less than the entirety of the representation of the process system; and
a current view region that corresponds to a current view of the representation of the process system, wherein the current view is an enlarged view of the first viewable area defined by the thumbnail viewport, and wherein the current view region comprises a clickable hyperlink hotspot that defines a current viewport defining a second viewable area;
responsive to a first user activation, moving the thumbnail viewport within the thumbnail region and updating the current view region; and
when the clickable hyperlink hotspot is selected, displaying the second viewable area in the current view region and adding a nested region configured to display the first viewable area, wherein the nested region comprises the current viewport;
wherein the thumbnail region is configured to identify at least one fault condition indicator outside of the current view and the thumbnail viewport.

2. The method of claim 1, further comprising:
responsive to a second user activation, resizing visual indicia associated with the process system within the current view region.

3. The method of claim 2, further comprising:
responsive to the second user activation, resizing the boundary of the thumbnail viewport.

4. The method of claim 3, wherein:
the second user activation defines an amount of zoom; and
resizing the boundary of the thumbnail viewport comprises enlarging or shrinking the boundary of the thumbnail viewport by an amount that is inversely proportional to the amount of zoom.

5. The method of claim 2, wherein:
the second user activation defines an amount of zoom; and
resizing the visual indicia within the current view region comprises enlarging or shrinking the visual indicia within the current view region by an amount that is proportional to the amount of zoom.

6. The method of claim 1, further comprising:
subscribing to operational data associated with visual indicia displayed in the current view region; and
upon updating the current view region, unsubscribing from operational data associated with visual indicia no longer displayed in the current view region.

7. The method of claim 6, further comprising:
upon updating the current view region, remaining subscribed to fault condition data for the visual indicia no longer displayed in the current view region.

8. The method of claim 1, wherein the at least one fault condition indicator comprises at least one alarm icon.

9. An apparatus comprising:
at least one processing device configured to generate a graphical display comprising a plurality of regions, at least two of the regions corresponding to different portions of a representation of an industrial process system, wherein the regions include:
  a thumbnail region that corresponds to an entirety of the representation of the process system, wherein the thumbnail region comprises a thumbnail viewport identifying a first viewable area defined by a boundary disposed and movable within the thumbnail region that corresponds to a portion of the representation of the process system that is less than the entirety of the representation of the process system; and
  a current view region that corresponds to a current view of the representation of the process system, wherein the current view is an enlarged view of the first viewable area defined by the thumbnail viewport, and wherein the current view region comprises a clickable hyperlink hotspot that defines a current viewport defining a second viewable area;
wherein the at least one processing device is further configured, responsive to a first user activation, to move the thumbnail viewport within the thumbnail region and to update the current view region;
wherein the at least one processing device is further configured, when the clickable hyperlink hotspot is selected, to display the second viewable area in the current view region and add a nested region configured to display the first viewable area, wherein the nested region comprises the current viewport; and
wherein the thumbnail region is configured to identify at least one fault condition indicator outside of the current view and the thumbnail viewport.

10. The apparatus of claim 9, wherein the at least one processing device is further configured, responsive to a second user activation, to resize visual indicia associated with the process system within the current view region.

11. The apparatus of claim 10, wherein the at least one processing device is further configured, responsive to the second user activation, to resize the boundary of the thumbnail viewport.

12. The apparatus of claim 11, wherein:
the second user activation defines an amount of zoom; and
the at least one processing device is configured to enlarge or shrink the boundary of the thumbnail viewport by an amount that is inversely proportional to the amount of zoom.

13. The apparatus of claim 10, wherein:
the second user activation defines an amount of zoom; and
the at least one processing device is configured to enlarge or shrink the visual indicia within the current view region by an amount that is proportional to the amount of zoom.

14. The apparatus of claim 9, wherein the at least one processing device is further configured to:
subscribe to operational data associated with visual indicia displayed in the current view region; and
upon updating the current view region, unsubscribe from operational data associated with visual indicia no longer displayed in the current view region.

15. The apparatus of claim 14, wherein the at least one processing device is further configured, upon updating the current view region, to remain subscribed to fault condition data for the visual indicia no longer displayed in the current view region.

16. The apparatus of claim 9, wherein the at least one fault condition indicator comprises at least one alarm icon.

17. A non-transitory computer readable storage medium comprising instructions that, when executed by at least one processing device, cause the at least one processing device to:
generate a graphical display having a plurality of regions, at least two of the regions corresponding to different portions of a representation of an industrial process system, wherein the regions include:
  a thumbnail region that corresponds to an entirety of the representation of the process system, wherein the thumbnail region comprises a thumbnail viewport identifying a first viewable area defined by a boundary disposed and movable within the thumbnail region that corresponds to a portion of the representation of the process system that is less than the entirety of the representation of the process system; and
  a current view region that corresponds to a current view of the representation of the process system, wherein the current view is an enlarged view of the first viewable area defined by the thumbnail viewport, and wherein the current view region comprises a clickable hyperlink hotspot that defines a current viewport defining a second viewable area;
responsive to a first user activation, move the thumbnail viewport within the thumbnail region and update the current view region; and
when the clickable hyperlink hotspot is selected, display the second viewable area in the current view region and add a nested region configured to display the first viewable area, wherein the nested region comprises the current viewport;
wherein the thumbnail region is configured to identify at least one fault condition indicator outside of the current view and the thumbnail viewport.

18. The non-transitory computer readable storage medium of claim 17, further comprising instructions that, when executed by the at least one processing device, cause the at least one processing device to:
responsive to a second user activation, resize visual indicia associated with the process system within the current view region.

19. The non-transitory computer readable storage medium of claim 17, further comprising instructions that, when executed by the at least one processing device, cause the at least one processing device to:
subscribe to operational data associated with visual indicia displayed in the current view region; and
upon updating the current view region, unsubscribe from operational data associated with visual indicia no longer displayed in the current view region.

20. The non-transitory computer readable storage medium of claim 19, further comprising instructions that, when executed by the at least one processing device, cause the at least one processing device to:
upon updating the current view region, remain subscribed to fault condition data for the visual indicia no longer displayed in the current view region.

* * * * *